United States Patent [19]

Rowe et al.

[11] 4,196,446
[45] Apr. 1, 1980

[54] TELEVISION PICTURE TUBE HAVING ENHANCED RESOLUTION AND COLOR PURITY

[75] Inventors: William A. Rowe, Palatine; James W. Schwartz, Deerfield, both of Ill.

[73] Assignee: Zenith Radio Corporation, Glenview, Ill.

[21] Appl. No.: 963,533

[22] Filed: Nov. 24, 1978

[51] Int. Cl.² ............... H04N 9/18; H01J 29/52; H01J 29/56
[52] U.S. Cl. ................................. 358/74; 358/65; 315/386
[58] Field of Search ............... 358/64, 65, 39, 74, 358/242, 243, 168, 66–70; 315/382, 383, 386, 12 ND

[56] References Cited

U.S. PATENT DOCUMENTS

| | | | |
|---|---|---|---|
| 2,613,333 | 10/1952 | Bull | 315/386 |
| 2,698,400 | 12/1954 | Schreiber | 315/382 |

Primary Examiner—John C. Martin
Attorney, Agent, or Firm—Ralph E. Clarke, Jr.

[57] ABSTRACT

A color television receiver system has a cathode ray picture tube including an imaging faceplate having deposits of multi-color phosphor targets thereon. The tube includes a three-beam electron gun and a color selection aperture mask having apertures in registration with the targets. A beam-current-control signal is derived from the scansion circuit means of the receiver system; the amplitude of the signal varies monotonically as a function of the distance of the beams from the center of the faceplate. Means are provided for receiving the beam-current-control signal for modulating the receiver system luminance signal with the beam-current-control signal, which has such characteristics that the modulation causes a predetermined gradational reduction in beam current as a function of the distance of the beam from the center of the faceplate. The benefits include enhanced color purity and improved resolution, and energy savings.

3 Claims, 4 Drawing Figures

TELEVISION PICTURE TUBE HAVING ENHANCED RESOLUTION AND COLOR PURITY

CROSS-REFERENCE TO RELATED APPLICATION

This application is related to application of common ownership herewith: application Ser. No. 963,534 filed Nov. 24, 1978.

BACKGROUND OF THE INVENTION AND PRIOR ART STATEMENT

This invention concerns means for enhancing the performance of television receiver systems having color cathode ray picture tubes with a three-beam gun, color selection aperture mask, and self-converging yoke.

Desired performance characteristics of color television receiver systems include optimum resolution, picture brightness, and color purity. Resolution is largely a function of the size and symmetry of the beam spots projected by the electron gun of the picture tube, or guns in plural beam tubes. Beam spots are desirably relatively small, symmetrically round, and uniform in size at all points on the picture screen. Achievement of these ideals is difficult because of the many factors which exert an influence on the configuration of beam spots. As a result of such factors, a beam spot that is small and symmetrical at the center point of the picture imaging field can become enlarged and distorted at the periphery of the field, as will be shown.

Key factors which influence beam spot size, size uniformity and symmetry in picture tubes having three-beam electron guns include the following:
(a) Electron gun design,
(b) Cathode ray tube screen potential,
(c) Magnitude of beam current,
(d) The "throw" distance from the electron gun to a given point on the screen; and,
(e) The convergence system.

The ability of an electron gun to project small, symmetrical beam spots is a major factor in achieving optimum resolution. The task of designing guns with this capability has become more challenging due to the reduction of space available for the gun in the cathode ray picture tube neck, which has become shorter and of smaller diameter. This physical constraint has been largely overcome by new, more effective gun designs, notably the gun having an extended field main focus lens described and claimed in U.S. Pat. No. 3,995,194 assigned to the assignee of this invention.

The potential of the cathode ray tube screen influences beam spot size, and hence resolution. Higher potentials cause a decrease in spot size, and potentials in the range of 28-32 kilovolts up from 20-25 kilovolts have become common. The higher potentials also provide the benefit of a brighter image as a result of the increase in beam energy.

The magnitude of the current of the electron beam, usually measured in milliamperes, has a pronounced effect on beam spot size. Beam spot growth is generally proportional to beam current. This fact has an important bearing on the invention disclosed herein, as will become evident.

A factor having a marked influence on the size of beam spots is the variance in "throw" distance from the electron gun to a given point on the screen. The effect of this variance is a significant increase in beam spot size from the center of the faceplate to its periphery. When an electron beam is scanning, the point of focus of the beam normally defines an arc in the horizontal and vertical planes. However, the area being scanned—the picture imaging screen—lies on an arc of much greater radius, and hence is relatively planiform in comparison. Such peripheral beam spot enlargement can result in a degradation of resolution at the sides of the screen.

The means used to cause the plural beams of an in-line electron gun to remain in convergence can also adversely affect beam spot symmetry. Beam spots which are round in the center area of the picture screen become distorted in the peripheral zones, with the distortion gradationally increasing from the center point of the screen. The effect is shown diagrammatically by beam spots 36 of FIG. 1, which show an ellipticizing of the beam spots at the periphery of the faceplate. Such deflection defocusing is attributable mainly to the "self-converging yoke" commonly used to converge the three beams on the screen. Although providing the benefit of reduced complexity of ancilliary convergence circuits or their complete elimination, the self-converging yoke produces nonuniformities in the magnetic deflection field that causes deflection defocusing. The loss in resolution due to deflection defocusing in a three-beam in-line electron gun as a consequence of selfconvergence can be particularly acute, especially in tubes of wide deflection angles such as an angle of 100° or greater.

The heating of the mask due to the impingement of the electron beams thereon can have an adverse effect on color purity. In a three-beam cathode ray picture tube of the type having a color selection aperture mask, the mask has apertures in registration with ones of multi-color phosphor targets deposited on the imaging screen. Color purity is dependent on the maintenance of such registration. Under the impingement of the electron beams upon the mask, which absorbs as much as 80% of the energy of the beams, the thin metal comprising the mask will expand. One result of the expansion is growth of the mask radially and movement of the mask towards the screen, causing misregistration and consequent color impurities. This movement can be largely compensated for by the use of temperature-responsive mask support springs, which cause the mask to move towards the screen in response to temperature increases in the mask, restoring registration. Another effect of mask heating, and one that cannot be compensated for by the support springs, is expansion of the mask under certain picture conditions wherein the mask "domes" in a localized area, resulting in color impurities in and around the area of the dome. The effect of doming is commonly most severe near the screen periphery.

Misregistration of mask apertures and assigned targets due to mask heating is commonly ameliorated by "grading" the mask; that is, forming the mask so that the apertures are made gradually smaller as a function of distance from the center of the faceplate. The additional "tolerance" provided by the grading largely nullifies the effect of misregistration and preserves color purity. However, mask grading results in a brightness fall-off toward the screen periphery. Further, mask grading imposes a definite limit to the amount of center brightness that can be usefully obtained from a picture tube. A physical limit on edge brightness is imposed by mask doming effects. Arbitrary increases in center-to-edge mask grading eventually lead to a "spotlight" effect wherein the brightness ratio between the bright center and the dim edges is visually objectionable. The combination of these effects therefore lead to a maximum attainable center brightness level as well as a maximum edge brightness level.

PRIOR ART STATEMENT

The inventive concept set forth in the present application represents the best mode of implementing the invention of our co-worker Richard W. Midland. The Midland invention, which comprises art prior to the present disclosure, is fully described and claimed in referent copending application Ser. No. 963,534, filed Nov. 24, 1978, assigned to the assignee of the present invention and of like filing date herewith. Midland discloses means for use in a television receiver system for providing greater spot size uniformity across the screen especially valuable in beam-index tube systems. A beam-current-control signal is derived from the horizontal scanning circuit means of the receiver system in which the amplitude of the signal varies as a function of the distance of the beam from the minor axis of the substantially rectangular faceplate. Means for receiving the beam-current-control signal for modulting the receiver system luminance signal with the beam-current-control signal are provided. The characteristics of the beam-current-control signal are such that the modulation causes a predetermined gradational reduction in beam current at least from the minor axis to the minor sides of the faceplate to inhibit beam spot enlargement in the side zones and thus provide greater spot size uniformity across the screen.

Techniques for dynamically varying the focus, convergence, and intensity of electron beams are well-known in the art. Dynamic focusing, for example, has been used to cause a beam to be in focus at the sides of the picture imaging field as well as at the center of the field. The need for dynamic focusing arises from the aforedescribed arcuate scanning of the beam relative to the substantially planiform faceplate. In electron guns emitting multiple beams, all beams may be dynamically focused.

Dynamic focusing of a beam or beams can be accomplished electronically by means of a focus-control signal modulated at the scanning frequency, with the signal being applied to a suitable beam-focusing electrode. Dynamic focusing means is disclosed by Richard in U.S. Pat. No. 3,412,281. An A.C. control signal is employed which is proportional to the distortion due to defocusing inherent in tube faces, according to Richard. The A.C. control signal is converted into a varying D.C. control signal which may be added to the relatively high-level constant voltage of the tube focusing circuit. Other approaches to dynamic focusing are disclosed by U.S. Pat. Nos. 2,801,363 and 3,084,276.

As noted, convergence of the beams of a multiple-beam electron gun will also vary as the beams arcuately scan the substantially planiform faceplate. Beam convergence may be achieved dynamically by slightly varying the relative angles of the beams while scanning. In dynamic convergence by circuit means, signals to induce dynamic convergence may be derived from the horizontal and vertical circuits of the television receiver system to provide a dynamic convergence-correction signal having the characteristics of a parabola. The voltage of the convergence-correcting signal is zero at the center of the picture imaging field, and changes towards the sides of the screen to effect convergence. Dynamic convergence signals may be applied to convergence coils located adjacent to the picture tube neck. Such a dynamic convergence circuit is disclosed by Nelson in U.S. Pat. No. 2,834,911. Parabolic convergence current waves are obtained by integration of pulse and saw tooth voltage waves in resistive and inductive reactive circuits, according to the teachings of Nelson.

An example of a deflection yoke providing for the self-convergence of multiple beams is disclosed by Chiodi—U.S. Pat. No. 3,643,192. As noted, the "self-converging" yoke can introduce the particularly troublesome form of beam spot distortion known as deflection defocusing.

In U.S. Pat. No. 4,057,747, Hamano discloses deflection-defocus-correction means for a color cathode ray tube having a three-beam in-line electron gun. The correction means are disposed adjacent the side electron beams, and are alleged to be effective in neutralizing the deflection defocusing of the side beams caused by the non-uniformity of the deflection fields of the self-converging yoke.

Shreve in U.S. Pat. No. 2,793,264, discloses means for controlling trace brightness in accordance with an average signal applied to the deflection plates of a cathode ray tube. U.S. Pat. No. 2,993,142—Harvey discloses means for maintaining constant beam brightness in a cahtode ray tube by compensating for changes such as those which occur when sweep speed is changed, or, when short pulses, or long pulses with a short rise time, are viewed.

OBJECTS OF THE INVENTION

It is a general object of the invention to provide means for improving picture quality of color television cathode ray picture tubes.

It is a less general object of the invention to provide means for improving picture quality in three-beam color-cathod ray picture tubes having color selection aperture masks and selfconverging yokes.

It is a more specific object of the invention to provide means for enhancing resolution, contrast, color purity and brightness in television picture tubes.

It is a specific object of the invention to provide means that make it possible to reduce or completely eliminate the need for aperture grading of color selection aperture masks.

It is another specific object of the invention to provide means for decreasing power consumption in television receiver systems.

It is yet another specific object of the invention to provide means for enhancing component and circuit life through less demanding high-voltage requirements.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
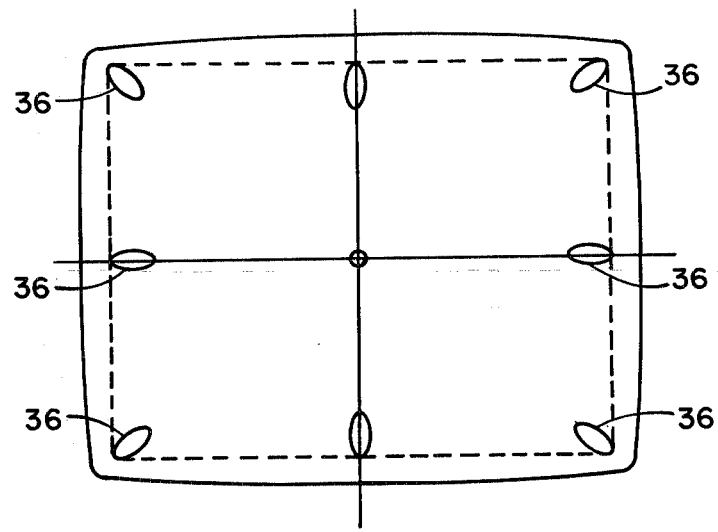
FIG. 1 shows diagrammatically the distortion of a beam spot caused by deflection defocusing.
Figure 2:
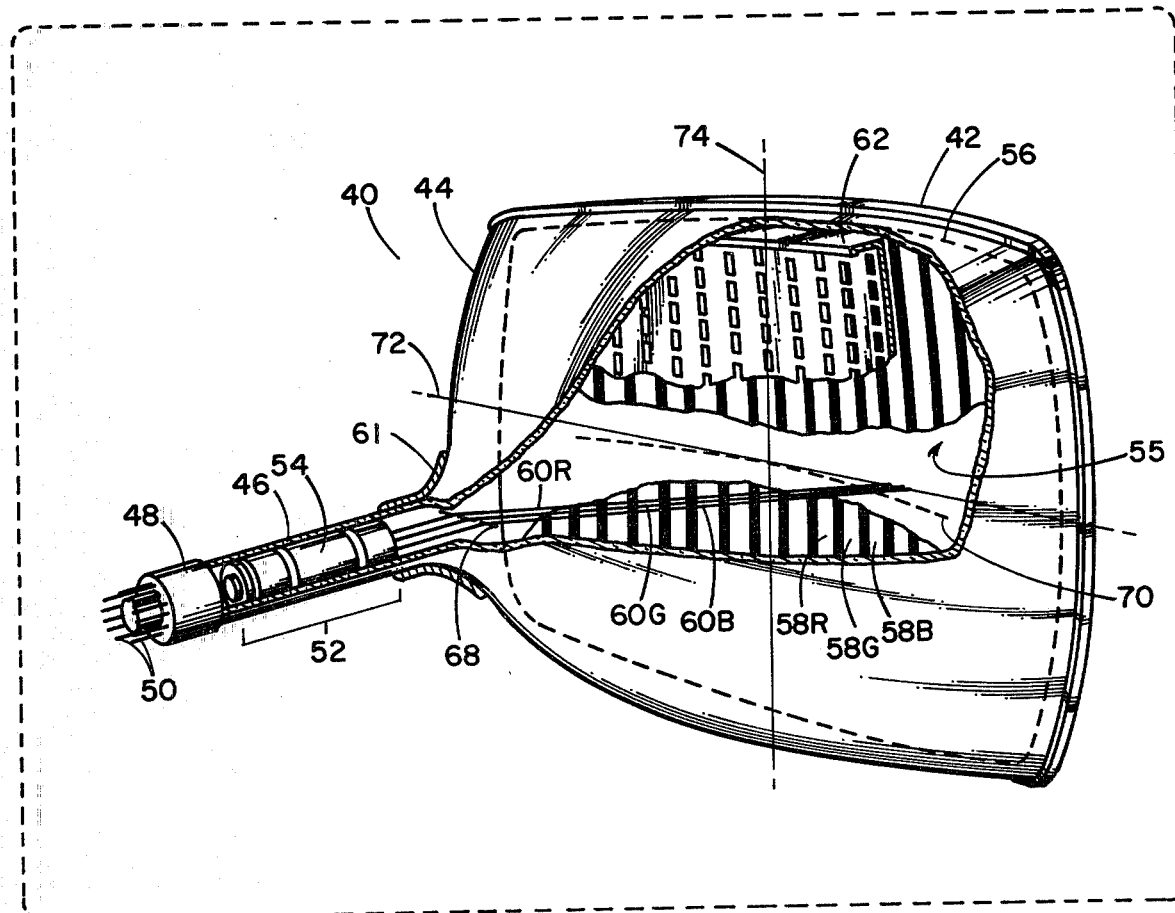
FIG. 2 is a view in perspective partly in section and partly cut away of a prior art cathode ray picture tube having a three-beam in-line electron gun wherein the invention may be employed.
Figure 3:
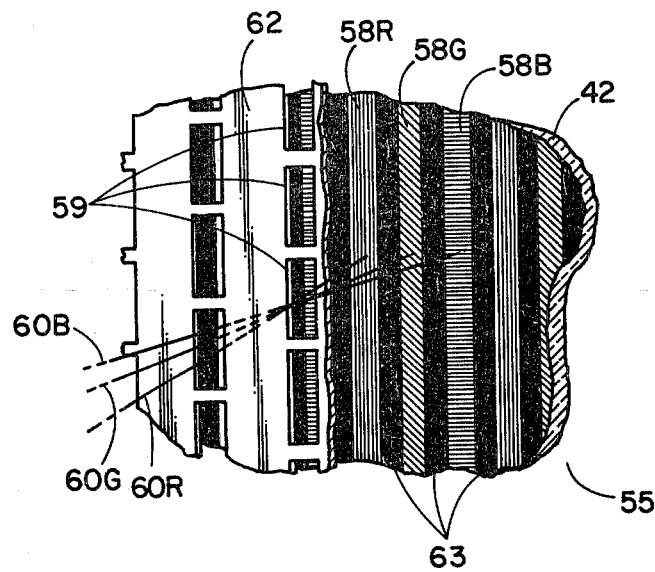
FIG. 3 is an enlarged detailed view of a section of the faceplate-aperture mask assembly of the tube shown by FIG. 2; and, FIG. 4 is a simplified shcematic diagram of circuit means for implementing the inventive concept.

FIG. 2 depicts a television receiver system 38 indicated highly schematically by the enclosing dash line, and in which the invention may be advantageously employed. Receiver system 38 has a multi-color television cathode ray picture tube 40. Picture tube 40 comprises an evacuated envelope including an imaging faceplate 42 having deposits of multi-color phosphors thereon, a funnel 44, a neck 46, and a base 48 through which protrude a plurality of electrical connectors 50 for making connection to components located within the sealed envelope of tube 40. An electron gun 52, indicated by the bracket, is enclosed in neck 46. Electron gun 52 is represented as being an in-line gun generating three electron beams 60R, 60G, and 60B which are focused by a main focus lens 54 onto a screen 55 deposited on the inner surface of imaging faceplate 42; the boundaries of the screen 55 are indicated by dash line 56. (Please refer also to FIG. 3, which comprises a detailed view of a section of the screen 55 of faceplate 42 of FIG. 2.)

Multi-color phosphor targets in the form of stripes of luminescing materials that emit light when excited by an electron beam comprise a red-light-emitting phosphor stripe 58R, a green-light-emitting phosphor stripe 58G, and a blue-light-emitting phosphor stripe 58B shown as being deposited on the screen 55 of faceplate 44. The targets are arranged in triads each associated with ones of the apertures 59 of adjacently located color selection aperture mask 62, the apertures being in registration with their respective targets. The targets are separated by intervening stripes of a light-absorptive "black surround" 63. The phosphor targets comprising stripes 58R, 58G, and 58B are excited to luminescence by electron beams 60R, 60G and 60B, respectively; the electron beams are caused to scan the screen 55 of faceplate 42 to selectively excite the aforesaid red-, blue-, and green-light-emitting targets through the intercessory color selection aperture mask 62.

Aperture mask 62 may be a "graded" mask; that is, the mask 62 may be so formed that the apertures 59 are graded so as to diminish in size as a function of distance from the center of the mask 62 to its periphery, at least in the horizontal direction. Such grading serves to provide increasing color purity tolerance in the peripheral zones of the screen. By diminishing the size of the apertures from the center to the periphery of the mask, the transmitted electron beamlets are made smaller in cross-sectional area upon passing through the apertures, thus increasing tolerance to the displacement which if of sufficient amplitude will result in color impurities. As a result of grading, the effects of misregistration are substantially minimized or completely alleviated. The penalty of mask aperture grading is diminished peripheral brightness; however, the benefits of color purity realized in peripheral zones outweighs the brightness loss in that brightness loss is less perceptible to the viewer than color impurity.

The picture tube shown by FIG. 2 is the type having a striped screen. The invention can also be advantageously employed in the type of picture tube wherein the imaging screen is comprised of a pattern of triads of phosphor dots, the dots of each triad emitting red, green and blue light. An adjacent color selection aperture mask has a similar dot pattern and has apertures in registration with the dot targets. The electron gun could comprise a gun of delta configuration. As with the striped-screen tube, the phosphor dot targets are selectively excited by three scanning beams through the intercessory aperture mask. The mask of the dot screen type of tube is also commonly graded so that the apertures diminish in size from the center to the periphery of the mask.

A graded aperture mask, one that provides a grade formation intended to offset normal brightness losses endemic to graded masks, is fully described and claimed in U.S. Pat. No. 3,790,839, assigned to the assignee of the present invention.

In company with other standard circuits for reproducing television broadcast signals, the application and operation of which are well known in the art, television receiver system 38 has means for developing a luminance signal, and horizonatl and vertical scansion circuit means (not shown). The luminance signal is developed in the television receiver luminance channel which produces the signal by amplifying the luminance portion of the video signal. The luminance signal controls image brightness by controlling electron beam current.

With reference again to FIGS. 2 and 3, beams 60R, 60G and 60B are caused to scan screen 55 by the horizontal and vertical scansion circuit means coupled to yoke 61 which engirds tube 40 in the area of the junction of funnel 44 and neck 46. Beam convergence is achieved by the self-converging properties of yoke 61 which establishes, in addition to main deflection magnetic components, an astigmatic field component which causes beams 60R, 60G and 60B to remain in convergence at all points on the screen 55 of faceplate 42.

The problems of mask heating and doming and deflection defocusing are ameliorated by the means according to the invention. A beam current control signal is derived from the aforedescribed scansion circuit means in which the amplitude of the signal varies monotonically as a function of the distance of the beams from the center of the faceplate. Means are provided for receiving the beam-current-control signal for modulating the luminance signal with the beam-current-control signal. The beam-current-control signal has such characteristics that the modulation causes a predetermined gradational reduction in beam current as a function of the distance of the beam from the center of the faceplate. As noted heretofore, the impingement of the beams on the mask while scanning causes localized peripheral heating and doming of the mask with consequent loss of registration, resulting in color impurities in the image. The predetermined gradational reduction in beam current as a function of the distance of the beam from the center of the faceplate is effective to reduce mask heating and doming and enhance color purity.

The predetermined gradational reduction in beam current at least from the center of the screen to the sides of the screen according to the invention, with consequent reduction in the heating and doming of the mask, provides another beneficial effect. As noted, the grading of the apertures of the mask to provide increased color purity tolerance in peripheral zones of the screen carries with it the penalty of diminished peripheral brightness. The beneficial effect is that, in one execution of the present invention, for a given maximum beam current and color purity tolerance, the grading is decreased and edge brightness thereby increased. In another execution, for a given maximum beam current and mask-aperture grade, color purity is increased.

With regard to the problem of deflection defocusing attributable to the distortive influence of the self-converging field of the deflection yoke, the predetermined gradational reduction in beam current according to the invention results in a reduction in cross-sectional area of the beams when passing through the field of the yoke. As a result, deflection defocusing is decreased, and picture resolution is improved.

In addition to the resolution of the problems heretoforedescribed, other benefits can be realized from the implementation of the invention in terms of improved operation and increased performance life of the television receiver system and associated cathode ray picture tube. One of the most significant of the benefits is the reduction in the energy requirement. In a receiver system having a 25-inch television picture tube, for example, it is entirely feasible that an over-all system energy saving of as much as 30% can be achieved. The power consumption of the 25-inch tube itself is about 50 watts; a reduction of about 30% in power consumption would result in an energy saving of 15 watts per tube. A corollary saving of about 15 watts may well be realized in the ancillary system itself for a total saving of about 30 watts per receiver system. A saving of this magnitude, when multiplied by the millions of television sets in service and manufactured every year, becomes highly significant in terms of nationwide energy saving.

The predetermined gradational reduction in beam current as a function of the distance of the beam from the center of the faceplate according to the invention will in turn result in a corollary reduction in the energy demand on the high-voltage supply. As a result, there will be less high voltage "sagging," which in turn will result in enhanced resolution and brightness. Also, color saturation and black level will remain relatively fixed because of the greater stability of the high voltage supply. Further, the reduction in beam energy requirement will extend the life of the electron gun, and in consequence, the service life of the associated picture tube.

As noted, in one execution of the invention, for a given maximum beam current and color purity tolerance, mask grading is decreased and edge brightness thereby increased. This brightness increased can be traded off, if desired, for a decrease in the high potential required for tube operation. Such potential is typically in the thirty-plus kilovolt range in the present-day picture tubes. Although providing the benefit of greater brightness, such high potentials are the source of many problems including the annoying electrical arcing of the picture tube, especially in and around the electron gun. To prevent or ameliorate this arcing, special and costly circuit components of the "contingent" variety may be required. If the high potential can be reduced from the thirty-plus range to the range of twenty-five to twenty-eight kilovolts, for example, yet provide acceptable brightness, the arcing problem could be largely alleviated and the manufacturing costs attributable to arc suppression means could be substantially reduced.

Yet another benefit is gained by the decrease in mask grading made possible by the means according to the invention. The opening up of the mask apertures increases the transmissivity of the mask to the electrons comprising the beams. As a result of this increase in transmissivity, coupled with the reduction in beam cross-sectional area due to the gradational reduction in beam current according to the invention, fewer electrons will strike the mask and bounce off the mask skirt; similarly, fewer electrons will bounce off the sides of the tube itself. Such electrons can follow a vagrant path and flood the screen, causing a white glow that reduces image contrast. Thus edge contrast can be appreciably improved by the means according to the invention.

Television receiver systems in which the inventive concept can be advantageously employed comprise well-known types; as a result, details as to the best mode of implementation of the invention can be devoted to a simplified description of suitable circuit means in connection with widely used television circuits and stages. Although similar in function, details of the types of components used, the specific circuit values, and the operating values of input and output signal voltages thereof will differ significantly among the many brands of television receiver systems currently available. So a detailed circuit description is eschewed in this disclosure in favor of a description of a basic functional circuit, the circuit details of which can be readily supplied and implemented by one skilled in the art in adapting basic circuits to specific television receiver systems. It is to be noted that the context of this disclosure, modulation of the luminance signal according to the invention connotes modulation of those aspects of the luminance and chrominance signals that affect beam current without changing the hue and saturation of the displayed signal.

Figure 4:
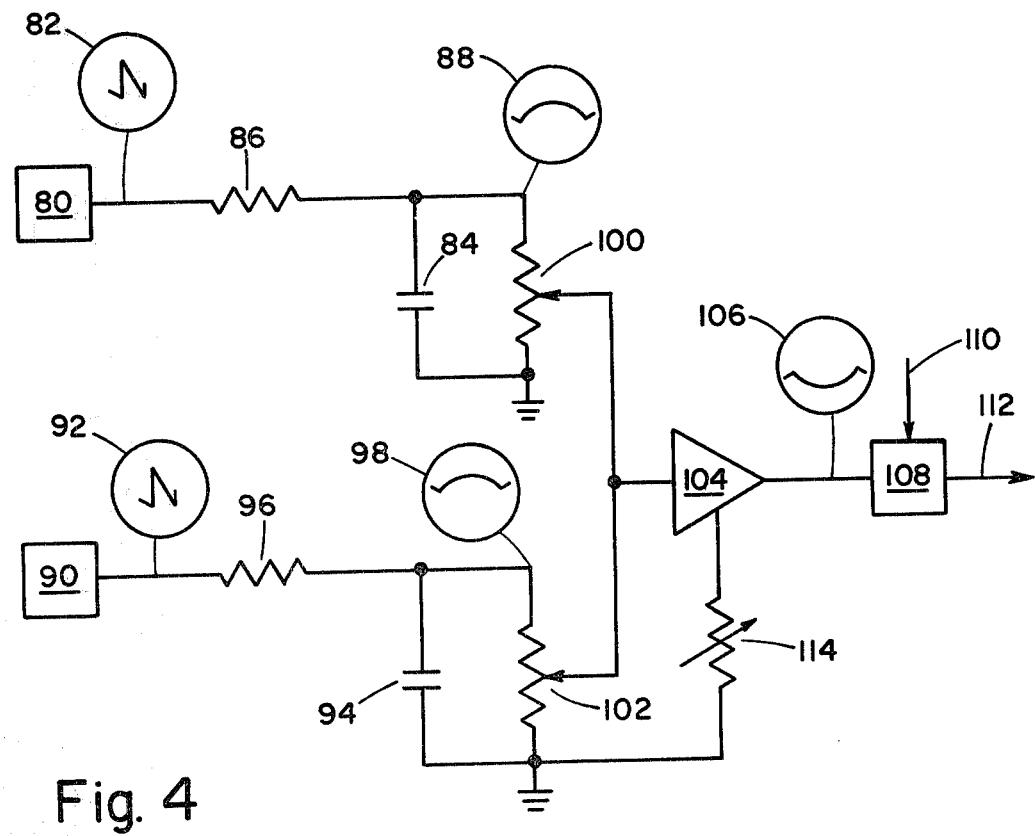

A suitable basic circuit is shown in highly schematic form by FIG. 4. A signal taken from the horizontal scansion circuit means 80 of the television receiver system is in the form of a sawtooth waveform 82. The signal can be taken from the horizontal yoke circuit, or from any of a number of other convenient points in the receiver system where the horizontal sawtooth waveform is present. Sawtooth waveform 82 is integrated by the well-known integrating network comprising capacitor 84 which is charged through resistor 86. The output is inversely proportional to the time constant of the resistor-capacitor combination. The values of capacitor 84 and resistor 86 are such as to produce a parabolic waveform 88.

Similarly, the signal taken from some convenient point in the vertical scansion circuit means 90 comprises a sawtooth waveform 92, which is integrated by the charging of capacitor 94 through resistor 96 to produce parabolic waveform 98. The parabolic waveform signals 88 and 98 are routed through level control potentiometers 100 and 102, respectively. Potentiometers 100 and 102 provide for proper balance of the combined signals applied to amplifier stage 104.

Amplifier stage 104 provides for amplification of the combined signals, producing parabolic waveform 106 of larger amplitude. Waveform 106 comprises the beam-current-control signal according to the invention derived from the scansion circuit means 80 and 90; the amplitude of the signal varies monotonically as a funtion of the distance of the beams from the center of the screen. Means for receiving the beam-current-control signal represented by waveform 106 comprises a television receiver luminance channel, indicated schematically by block 108, wherein the receiver system luminance control signal, indicated by arrow 110, is modulated by waveform 106. The resulting modulated output, indicated by arrow 112, is routed to the receiver system luminance signal amplifier stage. The amplified luminance control signal, which may be used for cathode modulation of the cathode ray picture tube, has such characteristics as to cause a predetermined gradational reduction in beam current at least from the center of the screen to the sides of the screen. Control of the amplitude of the modulated luminance signal can be attained by the introduction of a suitable variable resistor in the luminance channel circuit, as indicated schematically by variable resistor 114.

Other changes may be made in the above described apparatus without departing from the true spirit and scope of the invention herein involved, and it is intended that the subject matter in the above depiction shall be interpreted as illustrative and not in a limiting sense.

We claim:

1. In a television receiver system having a cathode ray picture tube including an imaging faceplate having deposits of multicolor phosphors thereon, said tube further including a three-beam electron gun and a color selection aperture mask having apertures in registration with said targets, said receiver system having means for developing a luminance signal, and horizontal and vertical beam scansion circuit means, and wherein the impingement of said beams on said mask while scanning causes localized peripheral heating and doming of said mask with consequent loss of said registration resulting in color impurities in the image, means for reducing said doming and its effects comprising:
    means for deriving a beam-current-control signal from said scansion circuit means in which the amplitude of said signal varies as a function of the distance of said beams from the center of the faceplate; and,
    means receiving said beam-current-control signal for modulating said luminance signal with said beam-current-control signal, said beam-current-control signal having such characteristics that said modulation causes a predetermined gradational reduction in beam current as a function of the distance of the beam from the center of said faceplate effective to reduce mask heating and doming and enhance color purity.

2. In a color television receiver system having a cathode ray picture tube including an imaging screen having deposits of multicolor phosphor targets thereon, said tube further including a three-beam electron gun and a color selection aperture mask having apertures in registration with said targets, said apertures being graded so as to diminish in size from the center to the periphery of said mask at least in the horizontal direction to provide increasing color purity tolerance in peripheral zones of said screen but at the penalty of diminished peripheral brightness, said receiver system having means for developing a luminance signal, and horizontal and vertical beam scansion circuit means, and wherein the impingement of said beams on said mask when scanning causes localized heating and doming of said mask with consequent loss of said registration resulting in color impurities in the receiver system image, means for reducing said doming and its effects comprising:
    means for deriving a beam-current-control signal from said scansion circuit means in which the amplitude of said signal varies monotonically as a function of the distance of said beams from the center of the screen;
    means receiving said beam-current-control signal for modulating said luminance signal with said beam-current-control signal, said beam-current-control signal having such characteristics that said modulation causes a predetermined gradational reduction in beam current at least from the center of the screen to the sides of the screen to reduce said mask heating and doming such that, in one execution, for a given maximum beam current and color purity tolerance, said grading is decreased and edge brightness thereby increased, or in another execution, for given maximum beam current and mask-aperture grade, color purity is increased.

3. In a color television receiver system having a cathode ray picture tube including a viewing screen having deposits of multicolor phosphor targets thereon, said tube further including an electron gun generating three electron beams for projecting three beam spots on assigned ones of said phosphor targets through a color selection aperture mask, said receiver system having means for developing a luminance signal, and horizontal and vertical beam scansion circuit means coupled to a beam deflection yoke having a self-converging field for scanning said beams and causing them to remain in convergence, and wherein said beam spots become distorted due to deflection defocusing of said beams resulting in loss of picture resolution, said deflection defocusing being attributable to the distortive influence of said self-converging field, said defocusing being in proportion to the magnitude of the cross-sectional area of said beams when passing through said field, means for ameliorating said deflection defocusing comprising:
    means for deriving a beam-current-control signal from said scansion circuit means in which the amplitude of said signal varies monotonically as a function of the distance of said beam spots from the center of said screen; and
    means receiving said beam-current-control signal for modulating said luminance signal with said beam-current-control signal, said beam-current-control signal having such characteristics that said modulation causes a predetermined gradational reduction in beam current at least from the center of the screen to the sides of the screen, resulting in a reduction in the cross-sectional area of said beams when passing through said field of said yoke, with consequent reduction in said deflection defocusing and improved picture resolution.

* * * * *